United States Patent [19]
Geise

[11] Patent Number: 5,533,406
[45] Date of Patent: Jul. 9, 1996

[54] VIRTUAL IMPACTOR

[75] Inventor: Hans-Ulrich Geise, Osterholz, Germany

[73] Assignee: Bruker-Franzen Analytik GmbH, Bremen, Germany

[21] Appl. No.: 429,832

[22] Filed: Apr. 27, 1995

[30] Foreign Application Priority Data

Apr. 29, 1994 [DE] Germany .......................... 44 15 014.8

[51] Int. Cl.$^6$ ..................................................... G01N 1/00
[52] U.S. Cl. ................................................................ 73/863.22
[58] Field of Search ................................ 73/28.05, 28.06, 73/863.22, 863.24; 55/270, 437; 209/143

[56] References Cited

U.S. PATENT DOCUMENTS

| | | | |
|---|---|---|---|
| 3,518,815 | 7/1970 | McFarland et al. | 73/28.05 |
| 4,358,302 | 11/1982 | Dahneke . | |
| 4,670,135 | 6/1987 | Marple et al. | 73/28.05 |
| 4,689,052 | 8/1987 | Ogren et al. . | |
| 4,767,524 | 8/1988 | Yeh et al. . | |

FOREIGN PATENT DOCUMENTS 0350716   6/1931   United Kingdom ................... 73/28.05

OTHER PUBLICATIONS

*Design Of A Multi–Stage Virtual Impactor*, Novick et al., Elsevier Science Publishing Co., Inc., (1984), pp. 143–145.
*Calibration Of A High–Volume Rectangular–Jet Virtual Impactor*, Overcamp et al. Aerosols in the Mining and Industrial Work Environments, (1983), pp. 961–969.
*Cascade Impactor Sampling & Data Analysis*, Lodge, Jr., Ph.D. et al., American Industrial Hygiene Association, (1986).
*Virtual Impactors: A Theoretical Study*, Marple et al., Environmental Science & Technology, (1980), pp. 976–985.

Primary Examiner—Robert Raevis

[57] ABSTRACT

The invention relates to virtual impactors with slits. Virtual impactors serve to enrich aerosol particles of certain orders of magnitude from gases, particularly from the ambient air, for the purpose of examining such particles. For very high degrees of enrichment to many hundreds of times the initial concentration very effective multistage virtual impactors have been developed with hundreds of nozzles but the latter are difficult to manufacture and clean. In principle the individual nozzles can be replaced by slits which are easier to manufacture. Since the ends of the slits cause considerable stability problems for the stream of gas the invention proposes using circular slits without ends.

14 Claims, 1 Drawing Sheet

VIRTUAL IMPACTOR

BACKGROUND OF THE INVENTION

1. Field of the Invention

This invention relates to impactors for the enrichment of aerosol particles and, in particular, to the use of virtual impactors for collecting the enriched aerosol particles.

2. Description of the Related Art

Impactors have been used for collecting aerosol particles for about 50 years now. The stream of gas containing the particles is accelerated towards a receptor plate by jet-forming nozzles in a generator plate. Due to their inertia the particles hit the receptor plate and are collected there whilst the gas deflects to the side. It is easy to realize that only heavy particles are collected whilst particles below a "cutoff threshold" size are conducted away by the stream of gas. A good overview is provided by the book entitled "Cascade Impactor, Sampling and Data Analysis", published by J. P. Lodge, Jr., and T. L. Chan, American Industrial Hygiene Association, Akron, USA (1986).

If the receptor plate, at the point where the particles would hit it, has a hole which will not take the gas stream from the jet, a "virtual impactor" is created. The particles enter the hole whilst the gas stream deflects to the side. Here too there is a "cutoff threshold" for the particles. If there is a chamber under the hole, particles with a size above the cutoff threshold can be collected in the chamber and be conducted away by a much smaller stream of gas. In this way it is possible to concentrate the particles into smaller gas flows. By applying this principle in a number of stages it is possible to achieve very high levels of enrichment where the particle concentration can reach several hundred times the initial concentration. A very good explanation of the principle and a theoretical calculation can be found in "Virtual Impactor: A Theoretical Study" by V. A. Marple and C. M. Chien, Environmental Science and Technology 14, 976 (1980).

For multistage impactors it is necessary to reduce the gas stream from stage to stage. To achieve consistent cutoff thresholds in the individual stages the nozzles and the collection conditions must remain the same from stage to stage. This means that there must be an extremely high number of nozzles in the first stage. The second stage requires far fewer nozzles, whilst the third stage requires only one in the limiting case. Good results with an enrichment of over 200 times can, for example, be achieved with 400 nozzles in the first stage, 20 in the second, and one nozzle in the third stage, in which the stream of air is reduced to about 1/400 in total.

The 400 nozzles in the generator plate of the first stage in the above example, and the corresponding receptor nozzles in the receptor plate, which must be adjusted in relation to one another with an exceptionally high degree of precision, are difficult to manufacture. Cleaning between operating phases is also difficult. Consequently, attempts have been made to replace the large number of circular individual nozzles by a single rectangular slit. A discussion of the properties can be found in a paper "Calibration of a High-Volume, Rectangular-Jet Virtual Impactor", T. J. Overcamp and D. E. Taylor, in "Aerosols In the Mining and Industrial Work Environments", Volume 3, published by V. A. Marple and B. Y. H. Liu, Ann Arbor Science, Butterworth Ltd, Sevenoaks, UK (1983).

A significant disadvantage of known slit-type nozzles is that the ends of the slit cause the impactor to operate with a high degree of instability. Also, in the vicinity of the end of the slit it is difficult to maintain the same cutoff limit which the rest of the slit produces. One proposal which has been made for overcoming the difficulty is to make the ends of the slit roughly heart-shaped (the slit is then roughly bone-shaped). However, this makes production and adjustment difficult. Furthermore, collection of particles in the impactor chamber causes difficulties with a long slit because the feed to the next stage becomes difficult and many particles tend to cling to the wall of the chamber. Having a number of short slits increases the problems at the ends of the slits.

SUMMARY OF THE INVENTION

The invention provides a virtual impactor for enriching aerosol particles which has a generator plate with an inlet side and an outlet side. A receptor plate is disposed generally parallel with the generator plate, so as to define a space between the generator plate and the receptor plate. The receptor plate has an inlet side facing the outlet side of the generator plate, and an outlet side facing away from the generator plate, A gas supply is provided on the inlet side of the generator plate, and an impactor chamber is located on the outlet side of the receptor plate. The impactor chamber also has an outlet port through which the aerosol particles may exit. An extractor is used which extracts gas from the space between the plates. The generator and receptor plates each include at least one nozzle in the form of a slit, the slits being curved and forming a closed loop.

The curved slits form a closed loop which is preferably circular, and may be located centrally in the generator plate and the reception plate of the impactor. The plates are each divided by the slit into an inner, preferably circular plate and an outer plate. The inner plate and the outer plate are mechanically connected to one another. In one embodiment the inner circular plate and the outer ring of the generator plate are interconnected via U-shaped retaining bridges. These bridges preferably taper towards the slit, such that the internal sides of the retaining bridges facing the slit have a sharp cutting edge the angle of the said edge being less than 90 degrees. The inner plate and outer ring of the receptor plate may be bolted to the corresponding parts of the generator plate using spacers to allow good adjustment of the slits in relation to one another. The inner (preferably circular) part of the generator plate may have a suction port via which the gas which deflects to the interior of the circular slit when the unit is in operation is extracted. In an alternative embodiment the receptor plates are connected by U-shaped bars to ensure free access of the gas to the jets of the generator plate.

Another embodiment has a pair of impactor frame plates. A number of slit units are provided (e.g. four), each with a circular jet slit. Each slit unit comprises part of a generator plate and part of a receptor plate, each of which possess a circular slit. Each of these slit units can be inserted into the impactor frame plates as a ready-assembled and adjusted unit.

For the two impactor plates the slit units each have an inner plate and an outer ring. The inner plates and outer rings of the partial generator plate are preferably, in turn, connected to one another via U-shaped bars of the kind described above. As indicated above, the bars preferably have a sharp edge directed toward the slit to allow effective impactor operation of the slit without turbulent disruption. The inner and outer rings of the partial receptor plate may be bolted to the corresponding parts of the partial generator plate using spacers.

The inner plate of the partial generator plate preferably has a suction port via which the part of the gas stream which deflects toward the interior of the circular slit during operation of the unit is extracted.

The impactor chamber under the receptor plate preferably has the shape of a truncated cone tapering toward its bottom, which in the lower part of the truncated cone accommodates the second stage of the impactor with the corresponding nozzles. Circular nozzles are preferably also used in the second stage, in order to avoid extraction from the interior of a circular slit impactor. The conical form guides the light gas stream in the chamber, and hence the particles as well, to this second stage at the lower end.

To prevent the particles, which have a finite sinking velocity after deceleration in the chamber, from being deposited on the conical walls, the wall may be scavenged with gas, for example, through tangential slits toward the pointed end of the cone. The sinking velocity of the particles is not very high—for spherical particles of normal density with a diameter of 10 micrometers it is approx. 3 millimeters per second, at a diameter of 5 micrometers it is only 0.8 millimeters per second, and at a diameter of 2 micrometers it is approx. 0.13 millimeters per second. For this reason the velocity of wall scavenging does not need to be very high. This stream of wall gas prevents particles from being deposited and feeds them to the second impactor stage.

BRIEF DESCRIPTION OF THE DRAWINGS

A preferred embodiment of the invention is illustrated in the accompanying drawings in which.

DETAILED DESCRIPTION OF A PREFERRED EMBODIMENT

Figure 1:
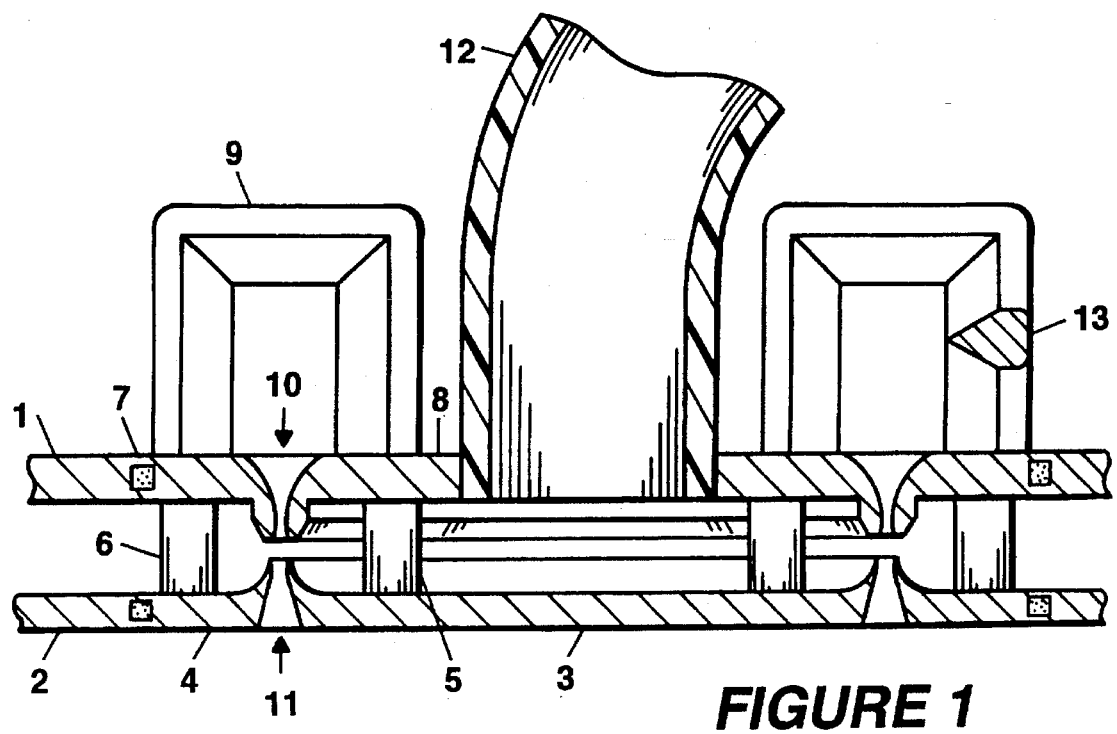
FIG. 1 is a schematic cross-sectional view of a virtual impactor according to the invention.

FIG. 1 shows a generator frame plate 1 and a receptor frame plate 2 into which a slit unit is inserted. The figure is a cross-section which bisects the two plates along a plane perpendicular to their surfaces. The slit unit comprises the following parts: The receptor inner plate 3 and the receptor ring plate 4 are bolted to the generator ring plate 7 and generator inner plate 8 via spacers 5 and 6. The generator ring plate 7 and generator inner plate 8 are connected to one another via U-shaped bars 9. The bars 9 have a sharp cutting-edge shape on the side facing the slit in order to avoid any eddies in the incoming air.

The slits in the two plates are each continuous and of a closed loop along the surface of its respective plate. The two slits are positioned opposite each other, and are preferably circular in shape (i.e. form a very narrow annulus in the plate surface). The feed to generator slit 10 is rounded to reduce eddy currents. Receptor slit 11 has sharp cutting edges. Extractor 12 removes the air deflecting inward. At point 13 the cross-section of the bars 9 is illustrated schematically, showing the wedge-shaped cutting edge on the inside of the bars.

Figure 2:
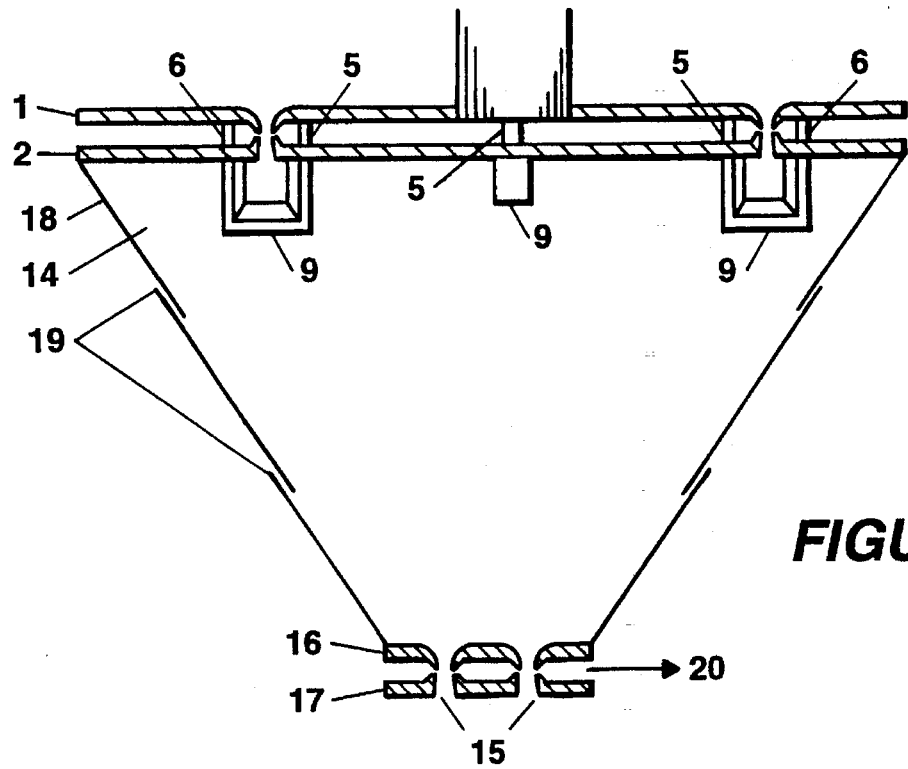
FIG. 2 is a schematic cross-sectional view of a portion of a virtual impactor according to the invention as attached to an impactor chamber.

As shown in the cross section of FIG. 2, the particles passing through the circular slits 10, 11 enter an impactor chamber 14 which, in the preferred embodiment, has the shape of a truncated cone. Also shown in FIG. 2 are U-shaped retaining bridges 9 which secure the portions of receptor plate 2, rather than attaching to generator plate 1. As with the embodiment of FIG. 1, spacers 5, 6 secure together respective portions of the receptor plate 2 and the generator plate 1. The impactor chamber 14 has at least one outlet port 15 which, in the preferred embodiment, is a pair of aligned circular slits like slits 10, 11. One circular slit is formed in a second generator plate 16 and the other circular slit, adjacent to and aligned with the slit in generator plate 16, is formed in a second receptor plate 17. The slit formed by generator plate 16, like that of generator plate 1, is rounded to reduce eddy currents. Similarly, the slit formed by receptor plate 17, like that of receptor plate 2, has sharp cutting edges. Thus, the circular slits formed by generator plate 16 and receptor plate 17 function as a second stage of the virtual impactor, with air deflected by the second stage (indicated by arrow 20 in FIG. 2) being drawn off by an extractor (not shown), similar to extractor 12.

In the preferred embodiment, the wall 18 of impactor chamber 14 has slits 19. Through the slits 19, air is supplied which flows along the wall 18. This air supply provides flushing of the wall 18 which reduces the deposition of particles on the walls after their deceleration in the impactor chamber.

A preferred embodiment of the invention for the collection of particles above a diameter of 2.5 micrometers from an air stream of 1.2 cubic meters per minute consists of an arrangement four slit units. The slit units make up two frame plates of approximately 55 millimeters in diameter, the slit units forming two annular slits, one in each of the frame plates. The generator slits have a width of 1.1 millimeters whilst the receptor slits are 1.5 millimeters wide. The distance between the slit edges is 1.8 millimeters. The centers of the slits must be adjusted accurately to within 0.1 millimeter. This creates a cutoff threshold of 2.5 micrometers for the aerodynamic diameter of particles with normal density.

If the cutoff threshold has to be lower, this can be achieved by using finer slits to reduce the air stream. Reduction of the air stream can, on the other hand, be offset again by extending total slit length.

With a wall scavenging of 2 liters per minute and a velocity of approximately 40 millimeters per second, particles with a diameter of up to 10 micrometers are fed to the second stage without any deposits. With a second stage comprising jets 19 each with a diameter of 1.1 millimeters there is an output flow of only 2 liters per minute which carries about 55% of all the particles in the input stream above the cutoff threshold.

To maintain the input stream of 1.2 cubic meters per minute it is necessary to create a partial vacuum of approximately 8 millibar.

To prevent the slits and nozzles from becoming soiled with fluff, fibers or even with large plant pollen, an input filter with a threshold of approximately 10 micrometers is fitted. This filter has a purely protective function—it has no other effect.

I claim:

1. A virtual impactor for enriching aerosol particles, comprising:

a generator plate having an inlet side and an outlet side;

a receptor plate disposed generally parallel with the generator plate, so as to define a space between the generator plate and the receptor plate, the receptor plate having an inlet side facing the outlet side of the generator plate, and an outlet side facing away from the generator plate;

a gas supply on the inlet side of the generator plate;

an impactor chamber on the outlet side of the receptor plate;

an outlet port in the impactor chamber;

an extractor for extracting gas from the said space between the plates; and wherein the generator and receptor plates each include an inner portion and an outer portion arranged to form at least one nozzle in the shape of a slit in each plate, and wherein each slit is curved and forms a closed loop such that it encompasses its respective inner portion and is encompassed by its respective outer portion.

2. A virtual impactor as claimed in claim 1, wherein the slits are annular.

3. A virtual impactor as claimed in claim 1, wherein the extractor is such as to extract gas both from the peripheral regions of the said plates and through a suction port in the region of the said plates which is circumscribed by the respective closed loop slits.

4. A virtual impactor as claimed in claim 3, wherein the suction ports are located in the generator plate.

5. A virtual impactor as claimed in claim 1 wherein a first one of said portions of at least one of the generator plate and the impactor plate which is circumscribed by its respective slit is connected to a second one of said portions of the same plate by connecting means including at least one U-shaped retaining bridge across said respective slit.

6. A virtual impactor as claimed in claim 5, wherein the connecting means comprises at least three retaining bridges.

7. A virtual impactor as claimed in claim 5, wherein sides of the retaining bridge facing the slit have a sharp cutting edge the angle of which is less than 90 degrees.

8. A virtual impactor as claimed in claim 5, wherein the first portion is a first portion of the generator plate and is attached to the second portion, which is a second portion of the generator plate, by the connecting means, and wherein a first portion of the receptor plate which is circumscribed by the slit in the receptor plate is attached to the first portion of the generator plate and a second portion of the receptor plate, which is to a side of the receptor plate slit away from the first portion of the receptor plate, is attached to the second portion of the generator plate.

9. A virtual impactor as claimed in claim 5, wherein the first portion is a first portion of the receptor plate and is attached to the second portion, which is a second portion of the receptor plate, by the connecting means, and wherein a first portion of the generator plate which is circumscribed by the slit in the generator plate is attached to the first portion of the receptor plate, and a second portion of the generator plate, which is to a side of the generator plate slit away from the first portion of the generator plate, is attached to the second portion of the receptor plate.

10. A virtual impactor as claimed in claim 1, wherein the impactor chamber under the receptor plate is conical, whereby the cone guides the aerosol particles to the exit port of the chamber.

11. A virtual impactor as claimed in claim 1, including means for passing a scavenging gas over the walls of the impactor chamber, to prevent the aerosol particles from coming into contact with the walls and to guide the aerosol particles to the outlet ports.

12. A virtual impactor as in claim 11, wherein means for introducing the scavenging gas is provided only where the arrangement of the circular slits would make it possible for the aerosol particles to come into contact with the walls.

13. A virtual impactor as claimed in claim 1, wherein the outlet port of the impactor chamber comprises, along with an additional impactor stage, a generator nozzle of a second impactor stage which enriches the aerosol particles.

14. A virtual impactor for enriching aerosol particles, comprising:

a generator plate having an inlet side and an outlet side;

a receptor plate disposed generally parallel with the generator plate, so as to define a space between the generator plate and the receptor plate, the receptor plate having an inlet side facing the outlet side of the generator plate, and an outlet side facing away from the generator plate;

a gas supply on the inlet side of the generator plate;

an impactor chamber on the outlet side of the receptor plate;

an outlet port in the impactor chamber;

an extractor for extracting gas from the said space between the plates; and wherein the generator and receptor plates each include a plurality of portions arranged to form at least one nozzle in the shape of a slit in each plate, and wherein each slit is curved to form a closed loop to provide a slit in the shape of an annulus.

* * * * *